Nov. 11, 1930.  L. DEUTSCH  1,781,374
HIGH PRESSURE GREASE GUN
Filed July 18, 1927  2 Sheets-Sheet 1

Witness:
F. Burkhardt

Inventor:
Leo Deutsch,
By Wilkinson, Huxley, Byron & Knight
Attys.

Nov. 11, 1930.  L. DEUTSCH  1,781,374
HIGH PRESSURE GREASE GUN
Filed July 18, 1927   2 Sheets-Sheet 2
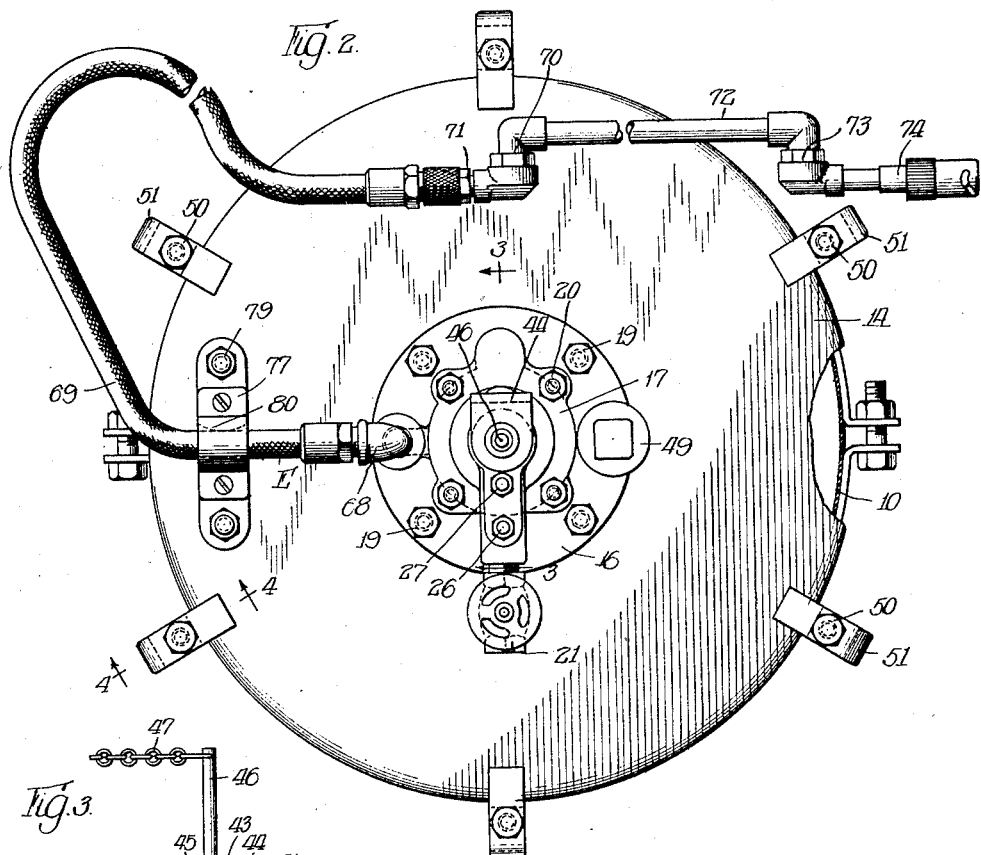
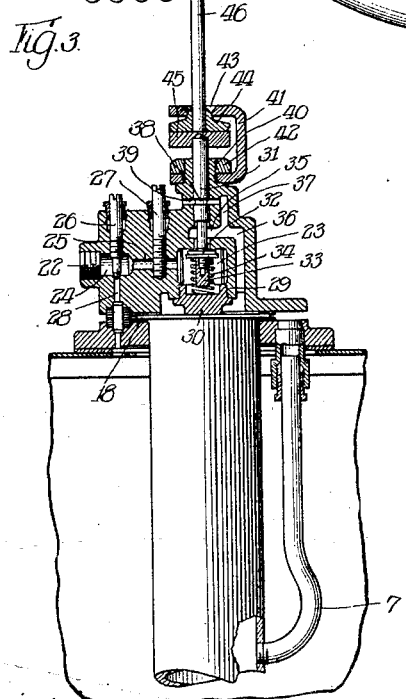
Witness:
R. Burkhardt.
Inventor:
Leo Deutsch,
By Wilkinson, Huxley, Byron & Knight Patented Nov. 11, 1930

1,781,374

UNITED STATES PATENT OFFICE

LEO DEUTSCH, OF BEAVER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND

HIGH-PRESSURE GREASE GUN

Application filed July 18, 1927. Serial No. 206,574.

This invention pertains to a dispensing device and more particularly to fluid pressure operated grease gun so constructed as to deliver lubricant under a materially greater pressure than that necessary to operate the device.

In the usual lubricating means now employed, especially lubricating means of the grease gun type, it may frequently become necessary to take the gun apart to load it during the lubrication of the machine, which is of course undesirable from the standpoint of loss of time as well as waste of the lubricant under repeated loading, and some of these guns although designed to deliver the lubricant at a higher pressure than that exerted to operate them, still are only manually operated and will not positively introduce grease between parts having small clearances. Further, it is necessary that the whole gun be taken at or near the part to be lubricated which oftentimes renders the gun very difficult to operate as the space near the parts to be lubricated may be very confined.

It is therefore an object of this invention to provide a dispensing device whereby operation may be effected at a distance remote from the device.

Another object is to provide a device which is readily applied to any standard or commercial lubricant container and will deliver said lubricant at a materially higher pressure than that used to operate the device.

Still another object is to provide a device which will deliver a measured amount of lubricant at a time under a high pressure.

Yet another object is to provide a device which will insure feeding of lubricant to the dispensing mechanism, will prevent collection of the lubricant in the top of the device, yet will at no time allow an excess pressure in said device.

A further object is to provide a device which will positively operate to deliver fluid under pressure, there being provision made that will prevent any balancing of the operating mechanism which might render the device inoperative.

A still further object is to provide a pressure controlled fluid dispensing device which may be universally operated, said device having a delivery means which is universal of application and operation.

With these and various other objects in view the invention may consist of certain novel features of construction and operation as will be more fully described and particularly pointed out in the specification, drawings and claims appended hereto.

In the drawings, wherein like reference characters are used to designate like parts—

Figure 2 is a top plan view of the device;

Figure 3 is a fragmentary sectional elevation of the operating valve and part of the associated high pressure cylinder, taken substantially on the plane as indicated by the line 3—3 of Figure 2; and Figure 4 is a fragmentary sectional elevation of one of the fastening means for holding the top to the container, taken substantially on the plane as indicated by the line 4—4 of Figure 2.

Figure 1:
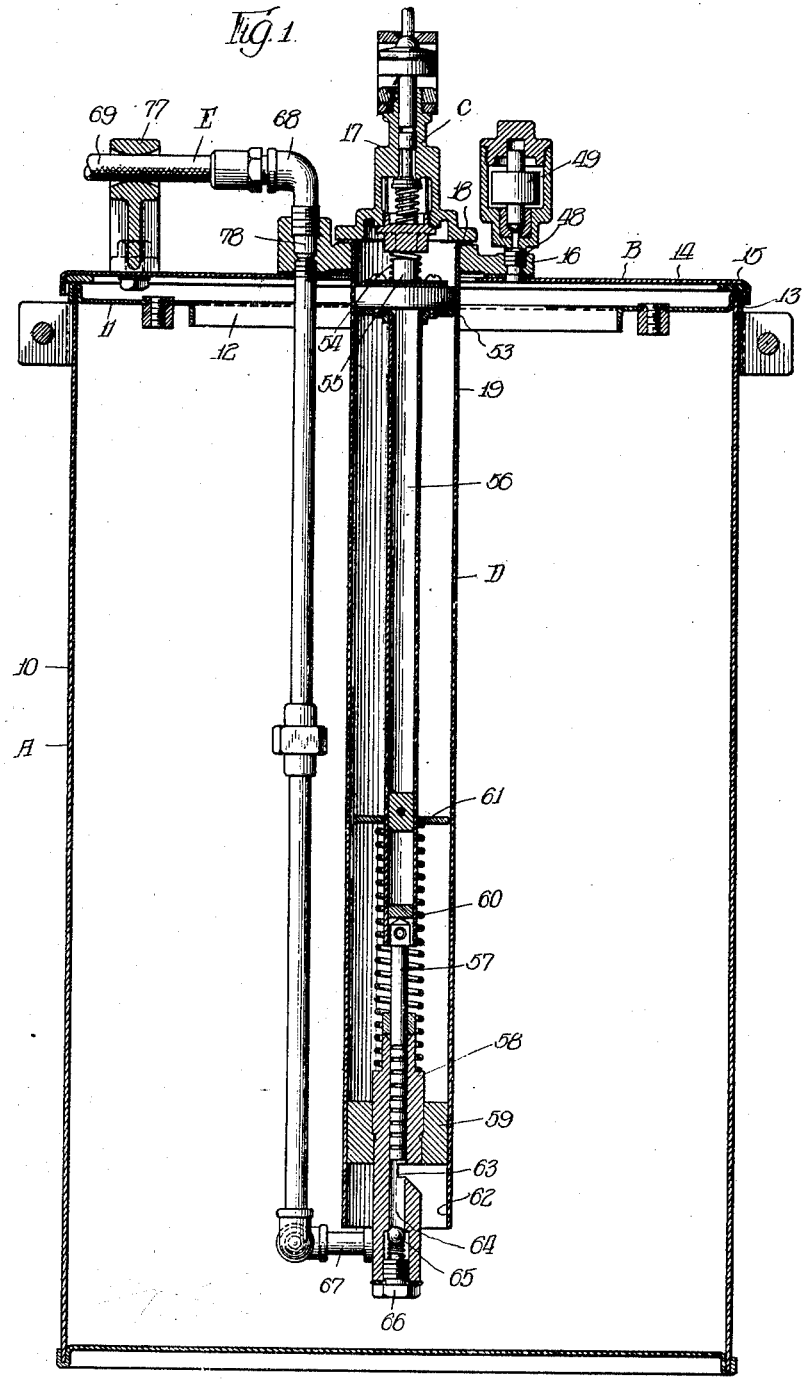
Figure 1 is a sectional elevation through the high pressure delivery apparatus as applied to the ordinary commercial or standard grease container.

In general, the ordinary standard or commercial grease container A is provided with a suitable opening in the top for the removal of the grease, which opening may be closed by a top B provided with a suitable fluid actuating valve mechanism C, this valve operating suitable mechanism disposed in a cylinder D associated with mechanism C and adapted to be inserted through the top into the container, said mechanism being adapted to dispense the contents of the container to the parts to be lubricated through a suitable outlet or hose E.

More specifically, the commercial lubricant can 10 is provided with a top 11 having an opening 12 therein adapted to be closed for shipping by a suitable top not shown. After this top is removed, the opening may be closed by the top 14 provided with a gasket 15 adapted to seat on the ridge 13 provided by the junction of the top 11 with the side of the container for the purpose of preventing leakage between the top and the container. The top 14 may be fastened to the container 10 by any suitable means such as screws or bolts 50 passing through and holding lugs 51 in securing relation with the top 14, the screws 50 being threaded into suitable lugs 52 provided at intervals on the side of the container.

The top 14 is provided with a suitable mounting 16 between which and suitable flanges on the valve housing 17 there is disposed the flange 18 formed on the depending cylinder 19 adapted to extend into the container downwardly to a point near the bottom thereof. The fitting 16 and the valve housing 17 are suitably fastened to each other and to the top 14 by any means such as the bolt connections 19 and 20 respectively.

Any fluid may be used to operate the valve, preferably compressed air being used, and a suitable valve or operating cock 21 tapped or screw-threaded into the valve housing 17 at 22 is provided for controlling the fluid flow to the housing 17. The fluid is introduced into a valve chamber 23 through suitable inlet channels 24 and 25 provided in the valve housing, there being air controlled means such as the needle valve 26 for controlling the flow of air into the container through a suitable channel 28 running through the valve housing and the fitting 16, and a threaded valve 27 controlling the flow of air through the channel 25 into the valve chamber 23. The bottom of the valve chamber is threaded at 29 and the spring seat 30 is adapted to have threaded engagement therewith. The valve stem 31 runs downwardly through the valve housing and is provided with a valve disc adapted to seat and close communication from the valve chamber 23 to the container and exhaust. The valve is provided with a depending portion 33 which serves as a positioning means for the spring 34 positioned between the valve disc 32 and the seat 30 tending to keep the valve closed. The portion 33 may also serve as a limiting means for preventing the valve from opening too far. The valve chamber communicates around the valve stem with a channel 35 communicating with another channel 36 extending downwardly for admitting fluid to the top of the cylinder 19. The channel 35 also communicates with a channel 37 extending upwardly and outwardly through the housing, past a groove 38 provided in the valve stem and adapted to register with the channel 39, thereby allowing communication with the atmosphere when the valve is in closed position.

The top of the valve housing is threaded at 40 and a suitable guide 41 is secured to the valve housing by suitable means such as the nut 42. The guide 41 is suitably apertured at 43 for permitting proper motion of a cam or shaped disc 44 which cooperates with a disc 45 provided on the top of the valve stem for operating the valve, the motion being imparted to the cam 44 through a suitable stem 46 actuated by a flexible means such as a chain 47 which may be universally operated at a point remote from the container 10. The fitting 16 may be apertured and threaded at 48, the aperture registering with an aperture in the top 14 leading to the top of the container, a suitable safety valve 49 being adapted to be threaded in the aperture 48 to be used for relieving any excess pressure in the top of the container, the valve being balanced for any predetermined pressure; for instance, seven pounds.

A low pressure piston 53 is provided in the cylinder 19, said piston being limited in upward movement by a cushioning spring 54 and lug 55 positioned at the top thereof and cooperating with the seat 30, it being understood that the low pressure piston is so formed as to prevent leakage past the piston skirt into the cylinder 19.

Fastened to the piston and running downwardly into the cylinder, there is a stem or rigid piston rod 56, provided at its lower end with a high pressure piston 57 adapted to operate in the high pressure cylinder 58 positioned by a suitable support 59 provided in the cylinder 19, which support is also adapted to prevent communication between the container and the part of the cylinder 19 above the support 59. A spring 60 is positioned between suitable shoulders preferably provided on the high pressure cylinder 58 and a suitable disc 61 provided on and secured to the rod 56, said spring tending to force the pistons upwardly into inoperative position. It will be noticed that the cylinder 19 is opened downwardly at 62 allowing communication between the high pressure cylinder and the container. An opening 63 is provided in the high pressure cylinder allowing a space 64 between the opening and a one-way valve 65 provided for closing the bottom part of the high pressure cylinder. The valve may be held in position by any suitable spring carried by a threaded screw 66 provided in the bottom of said cylinder. Below the valve there is provided a connection 67 extending upwardly through an aperture in the top 14 and preferably threaded to the fitting 16. The connection 67 then communicates through an opening 78 to a fitting 68 which in turn has fastened thereto a flexible hose or outlet 69. The other end of said hose is provided with a fitting 70 connected to the hose by a suitable pivot 71, this fitting 70 providing a rotatable connection with a rigid connection or pipe 72 in turn connected through a pivot 73 to a rigid fitting having delivery nozzle 74 rotatably connected thereto. By this construction, it will be seen that the nozzle 74 has practically a double universal movement with respect to the hose 69.

An outlet fitting 75 is threaded or otherwise secured to the cylinder 19 and to the fitting 16 at 76 so that there will at all times be a communication through this fitting 75 between the cylinder and the atmosphere. A suitable bracket 77 may also be provided suitably fastened to the top 14 by bolts or other means 79 and serving as a supporting device for the hose 69, this bracket being provided with curved faces 80 for preventing cutting or knuckling of the hose 69.

In the operation of this device, it will be seen that it is only necessary to position and fasten the top 14 to any standard lubricant container 10 with the cylinder 19 extending down into the lubricant, after which a compressed air connection may be coupled through the cock 21 to the operating valve mechanism. An operator then to lubricate a part applies the nozzle 74 to a suitable coupling on the parts to be lubricated and pulls on the chain 47, arcing the stem 46, causing the cam 44 to rotate, forcing the valve disc 32 downwardly, unseating the valve and allowing the compressed air to enter the housing through the channels 24 and 25 and into the valve chamber 23. It will of course be understood that the regulating device 27 has been suitably positioned to allow passage of the air into the chamber 23. When the valve has been depressed, the groove 38 will no longer register with the atmospheric channel or port 39 so that the compressed air will travel through the channel 35, down the channel 36 to the top of the piston 53, causing the piston to travel downwardly, compressing the spring 60 and forcing the high pressure piston 57 past the opening 63, closing said opening, and down into the lubricant containing portion 64 of the high pressure cylinder 58. It will be assumed that a shot of lubricant was contained in the portion 64 of the high pressure cylinder. On the down stroke of the piston 58, this lubricant will then be forced past the valve 65, through the fitting 67, past the fitting 68, through the hose 69 and out through the nozzle 74.

It has been found desirable to so proportion the low pressure and high pressure pistons that there will be a high multiplying power between said pistons, say of approximately thirty; that is, for every one pound of pressure applied to the piston 53, thirty pounds pressure will be applied to the grease in the high pressure cylinder 58. The portion 64 of the high pressure cylinder is so proportioned that the shot will be just sufficient to lubricate ordinary bearings; it being understood of course that any number of shots may be applied to a bearing by repeated actuation of the chain 47.

When the chain is released, the spring 34 will raise the valve disc 32, closing communication between the chamber 23 and the channel 35. As the valve rises, communication is established between the channel 37 and the atmospheric port 39 through the groove 38 provided with the valve stem 31. Opening this port to the atmosphere allows the spring 60 to move the low and high pressure cylinders upward, forcing any air contained above the low pressure cylinder 53 upwardly through channels 36 and 37 to the atmosphere through port 39. As the high pressure cylinder moves upwardly, the valve 65 will seat, preventing any lubricant from returning from the fitting 67 to the space 64. There is of course then a vacuum created in the space 64 of the high pressure cylinder and lubricant from the container will of course move through the openings 62 and 63 to fill the space 64 with another shot of lubricant. It will also be noticed that the needle valve 64 is so positioned that air travels through the channel 28 into the top of the container, tending to force the grease downwardly preventing grease from staying at or near the top of the container.

As before pointed out, the safety valve 49 is so constructed as to relieve the top of the container of any pressure over approximately seven pounds, which has been found to be the pressure sufficient for moving the lubricant downwardly. A positive operation is insured by providing the bleed 7 below the travel of the piston 53, this bleed being connected directly to the atmosphere, thereby preventing pressure from building up between the piston 53 and the fitting 59, which pressure would cause a balance on either side of the piston 53 thereby preventing its operation.

It will be understood that I do not wish to be limited by the exact embodiments of the device shown herein which it will be understood are merely by way of illustration and not by way of limitation, as other and various forms of parts of the device will of course be apparent to those skilled in the art.

I claim:

1. In dispensing apparatus, the combination of a lubricant container, a cylinder therein disposed to have access to substantially the entire amount of lubricant, a piston disposed in said cylinder and retractable from a portion thereof whereby substantially a vacuum is formed in said portion for aiding ingress of lubricant thereto, a discharge connection from said container having cooperative relation to said cylinder, a cylinder disposed adjacent said first named cylinder, a piston therein having cooperative relation to said first named piston whereby movement of said second piston moves said first piston, means for operating said second piston including a housing having communication with said second cylinder and a source of fluid pressure supply, the connection between said source and said second piston being normally closed by means of a valve, said housing having an exhaust normally in communication with said second cylinder through a portion of said valve, said housing having a passage connecting said source and said container whereby pressure from said source is applied to the lubricant therein for tending to move said lubricant toward said first piston, and means adapted to be operated from a point remote from said container for moving said valve for connecting said source and said second named piston and disconnecting said exhaust from said second named piston.

2. A dispensing unit for lubricant containers including a top adapted to be secured to said container, said top supporting cylinders extending into said container, a low pressure piston and a high pressure piston controlled by said low pressure piston, said pistons being operatively associated with said cylinders, means cooperating with said high pressure piston whereby lubricant may be forced out of said container, fluid operating means for said low pressure piston comprising a fluid connection, an operating valve movable by a movement of translation, means for operating said operating valve, said last named means including a pivotally mounted cam engaging said valve for controlling operation thereof, said cam having an elongated member for remotely operating said cam from any of a plurality of directions.

3. In a device of the character described, the combination of a cylinder positioned in lubricant to be dispensed, a piston in said cylinder adapted to actuate another piston, said latter piston being adapted to travel in a cylinder having access to said lubricant, movement of said latter piston serving to cause the piston to close access to said lubricant and to expel lubricant from said latter cylinder to discharge means associated with said latter cylinder, means for operating said first named piston including a valve housing communicating with said first named cylinder, and a fluid actuating valve in said housing for controlling flow of fluid to said first named piston.

4. In a device of the character described, the combination of a cylinder positioned in lubricant to be dispensed, a plurality of pistons disposed in said cylinder, a cylinder disposed in and supported by said cylinder cooperating with one of said pistons, said latter cylinder having a port for introduction of said lubricant and another port for discharge of said lubricant, one of said ports being controlled by the position of said piston, operating means for one of said pistons including means for controlling movement of one of said pistons and an elongated link member associated with said last named means and extending to a point remote from said device for operating said last named means, and means for returning said pistons to inoperative position.

5. In a device of the character described, the combination of a container, a cover therefor, a valve housing, a fluid actuating valve therein, an elongated link member on the housing extending to a point remote from the container for operating said valve, a cylinder extending into said container, a piston in said cylinder adapted to be controlled by said valve, a cylinder disposed in said first named cylinder and communicating with said container, a piston in said cylinder adapted to be actuated by said first named piston, a part of said second named cylinder communicating with an outlet through a one-way valve, and a connection between said first named cylinder and the atmosphere between said cylinders to prevent balancing of pressures between said cylinders.

6. In a device of the character described, the combination of a container, a cover therefor, a valve housing providing inlet and outlet connections to a cylinder in said container, a valve controlling said inlet and outlet connections, fluid inlet means to said valve and the top of said container, said inlet means being disposed in said housing and communicating with said inlet connection, a piston in said cylinder operated by said valve, a cylinder in said first named cylinder, supporting means for said cylinder preventing access from the container to said first named cylinder, a piston in said second named cylinder actuated by said first named piston, resilient means disposed in said first named cylinder and cooperating with said first named piston for returning said piston to initial operating position, said second named piston providing means for dispensing from said container through its outlet connections by actuation of said piston in said second named cylinder, and means in said cover preventing raising the fluid pressure in the top of said container above a predetermined amount.

7. In a device of the character described, the combination of a container, a cover therefor, a valve housing providing inlet and outlet connections to a cylinder in said container, a valve controlling said inlet and outlet connections, regulated fluid inlet means to said valve and the top of said container, said inlet means being disposed in said housing and communicating with said inlet connection, a piston in said cylinder, a cylinder in said first named cylinder communicating with said container and having a valve therein for communication only with an outlet means, supporting means for said cylinder preventing access from the container to said first named cylinder, a piston in said second named cylinder actuated by said first named piston, resilient means disposed in said first named cylinder and cooperating with said first named piston for returning said piston to initial operating position, said second named piston providing means for emptying said container through said second named cylinder, and means in said cover preventing raising the fluid pressure in the top of said container above a predetermined amount.

Signed at Rochester, Pennsylvania, this 13th day of July, 1927.

LEO DEUTSCH.